United States Patent [19]

Sager

[11] Patent Number: 4,993,366
[45] Date of Patent: Feb. 19, 1991

[54] LEASH

[76] Inventor: Thomas W. Sager, 2909 High St., Eugene, Oreg. 97405

[21] Appl. No.: 501,006

[22] Filed: Mar. 29, 1990

[51] Int. Cl.⁵ .............................................. A01K 27/00
[52] U.S. Cl. .................................................... 119/109
[58] Field of Search ................. 119/96, 106, 109, 117, 119/118; 54/71

[56] References Cited

U.S. PATENT DOCUMENTS

| | | | |
|---|---|---|---|
| 790,996 | 5/1905 | Avery | 119/109 |
| 2,337,970 | 12/1943 | Cassell | 119/109 |
| 2,593,940 | 4/1952 | Van Meter | 119/96 |
| 2,737,154 | 3/1956 | Michonski | 119/109 |
| 4,522,153 | 6/1985 | Vander Horst | 119/109 |
| 4,541,364 | 9/1985 | Contello | 119/109 |

Primary Examiner—Gene Mancene
Assistant Examiner—R. Thomas Price
Attorney, Agent, or Firm—James D. Givnan, Jr.

[57] ABSTRACT

A leash having elastic and nonelastic segments wherein forces imparted to the user and the pet are in a cushioned manner. The nonelastic member may be of woven material in tubular form to house at least a portion of the elastic member which may be a bungee cord. A modified form of the leash includes a buckle for coupling nonelastic leash components to provide the option of the leash being of a fixed length.

5 Claims, 1 Drawing Sheet

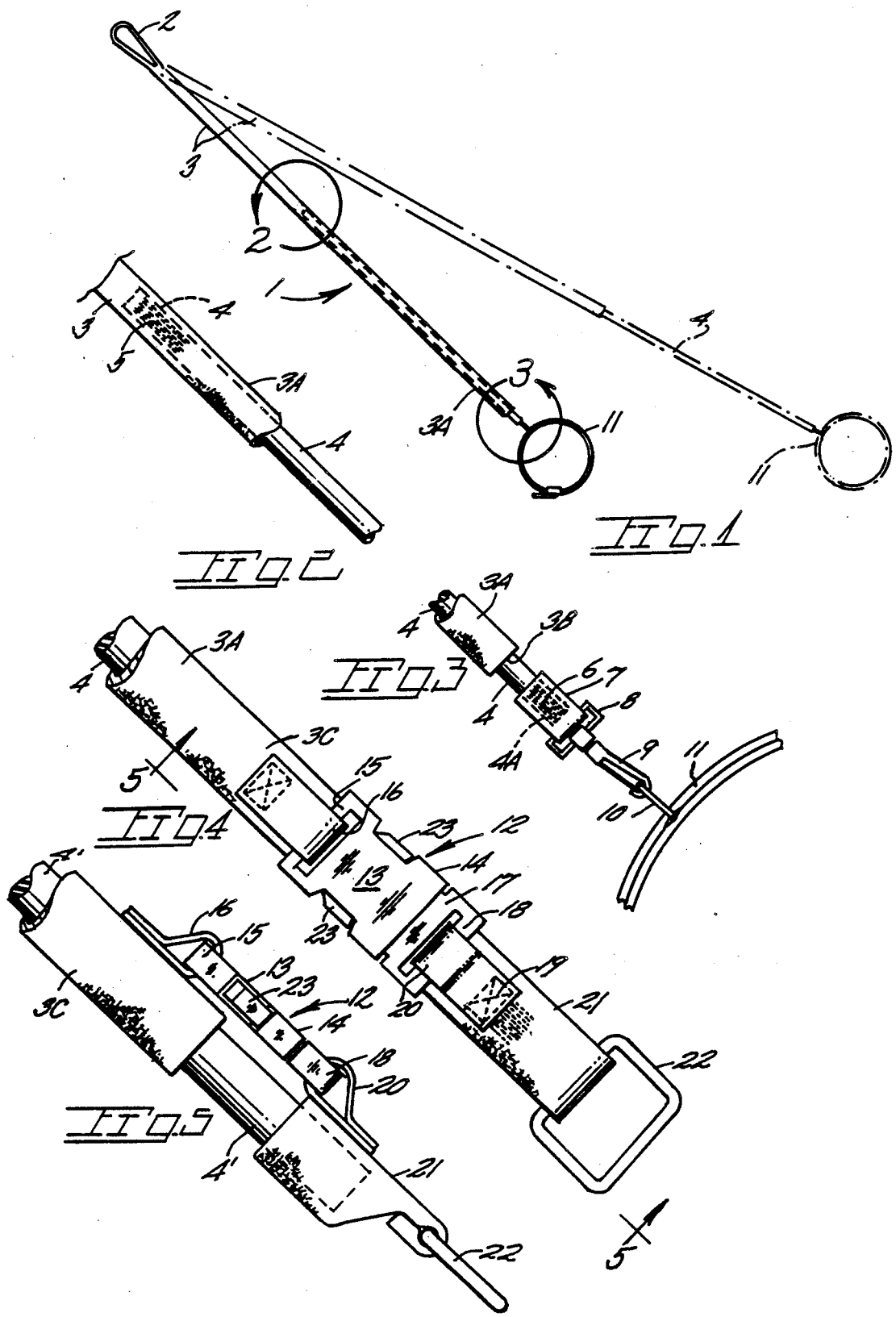

LEASH

BACKGROUND OF THE INVENTION

The present invention concerns generally leashes for the restraint of pets. To the extent known, leashes typically include a length of nonelastic line or cord with one end provided with means for coupling to a pet collar. Such leashes do not provide for restraining the pet in a resilient manner, but rather cause sudden forces to be imparted to the pet and the user. When walking larger breeds of dogs, considerable force may be exerted on the person's hand to the extent that the grip on the leash may be lost or at least a degree of discomfort experienced by the person. Further, when walking a pet using a bicycle, the sudden forces can cause accidental upset of the rider.

U.S. Pat. No. 1,699,308 is of some interest in that it discloses an animal tether shown as a chain attached to a flexible post which in turn is biased by a spring toward an upright position.

SUMMARY OF THE PRESENT INVENTION

The present invention is embodied within a leash having an elastic component for exerting a cushioned, snubbing action on the tethered animal. The leash includes a nonelastic portion to which is attached an elastic segment with provision made for attachment to a pet collar. In one embodiment of the leash, the elastic component is housed within a tubular sleeve portion to provide a leash of standard length and appearance until such time as an exerted force stretches the elastic segment. Accordingly, tensioning of the leash occurs in a gradual manner to the extent that a pet may be walked while the owner rides a bicycle without risk of upset. The present leash may be provided with elastic segments having different degrees of elasticity according to pet size and strength. A still further embodiment of the present leash includes coupling means joining nonelastic segments of the leash to provide the option of a leash of fixed length.

Important objectives include the provision of a leash wherein tensioning of the leash occurs in a gradual manner for the benefit of the tethered animal as well as the user; the provision of a leash wherein an elastic segment is housed within a nonelastic segment to provide a leash of standard length until tensioned; the provision of a leash including a coupling joining nonelastic and elastic segments of the leash to permit selective use of the resilient feature of the leash.

BRIEF DESCRIPTION OF THE DRAWINGS

In the accompanying drawings:

FIG. 1 is an elevational view of the present leash with an extended tensioned configuration shown in broken lines;

FIG. 2 is an enlarged fragmentary view of that portion of the leash encircled at 2 in FIG. 1;

FIG. 3 is an enlarged fragmentary view of that portion of the leash encircled at 3 in FIG. 1;

FIG. 4 is an enlarged fragmentary view of a modified form of the leash disclosing a coupling joining nonelastic portions of the leash; and FIG. 5 is a view taken along line 5—5 of FIG. 4.

DETAILED DESCRIPTION OF THE PREFERRED EMBODIMENTS

With continued attention to the drawings wherein applied reference numerals indicate parts similarly hereinafter identified, the reference numeral 1 indicates generally a pet leash having a looped portion 2 at one end constituting a handle. A nonelastic tubular member 3 is attached to an elastic member 4 as by stitching at 5. A preferred embodiment of the leash includes a nonelastic tubular member 3 having an inside diameter large enough to receive an elastic member 4. Nonelastic member 3 has a lower end portion 3A which terminates at an open end 3B. A suitable material for nonelastic segment 3 may be woven nylon.

Elastic member 4 terminates at its outer end at 4A stitched at 6 inside a short tubular segment 7 which is reversed and stitched back on itself to receive a ring 8. A snap 9 is engageable with a ring 10 on a pet collar 11.

In the preferred form, elastic member 4 extends beyond the midpoint of nonelastic member 3 to provide considerable leash extension as shown in broken line S in FIG. 1. Elastic member 4 is suitably embodied in a length of rubber cord termed bungee cord and accordingly stretches in a uniform manner.

With attention to FIGS. 4 and 5, a still further modified form of the leash is therein disclosed and incorporates coupling means indicated generally at 12 to provide the added option of the leash being of a fixed length i.e., nonelastic. The coupling means includes a buckle 13 which may be of the type disclosed in U.S. Pat. No. 4,150,464 and incorporates a main buckle member 14 having a bail 15 about which a loop 16 extends. Loop 16 has overlapped ends permitting stitched attachment to a lower end segment 3C of nonelastic member 3. A remaining buckle member at 17 insertably engages main buckle component 14 and also includes a bail at 18 through which passes a second fabric loop 20. Stitching at 19 secures the loop 20 to a short segment 21 of tubular fabric which is reversed back upon itself to receive a ring 22. For ease of collar attachment, ring 22 is provided with a snap (not shown).

In use, the elastic member 4' will extend and retract along its length in response to forces exerted by the pet and the leash user. In certain instances wherein a leash of fixed length is desired, the buckle or coupling means 12 will be utilized. Uncoupling of the buckle components by inward fingertip pressure exerted on yieldable locking members 23 permits extraction of same from main lock member 14 whereafter leash length will be variable.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A pet leash comprising,
    an elongate tubular member of a nonelastic nature, said tubular member of a pliable nature,
    an elongate elastic member normally housed in said tubular member and attached at one end to said tubular member at a point along the interior of said tubular member, and
    another end of said elastic member adapted for attachment to a pet collar.

2. The leash claimed in claim 1 wherein said tubular member internally receives a major portion of said elastic member.

3. The leash claimed in claim 2 wherein said elastic member includes a nonelastic segment for collar attachment, coupling means on said tubular member and said nonelastic segment for selective coupling of said tubular member to said nonelastic segment to provide a leash of fixed length.

4. The leash claimed in claim 3 wherein said coupling means is a buckle of the type having a pair of manually actuated locking members.

5. The leash claimed in claim 1 wherein said tubular member is of woven fabric.

* * * * *